Dec. 15, 1964

F. K. PREIKSCHAT 3,161,875

OBJECT LOCATING SYSTEM

Filed May 29, 1961

INVENTOR.
FRITZ K. PREIKSCHAT

BY
Reynolds & Christensen

ATTORNEYS

Dec. 15, 1964 F. K. PREIKSCHAT 3,161,875
OBJECT LOCATING SYSTEM
Filed May 29, 1961 3 Sheets-Sheet 2

INVENTOR.
FRITZ K. PREIKSCHAT
BY
Reynolds & Christensen
ATTORNEYS

Dec. 15, 1964  F. K. PREIKSCHAT  3,161,875
OBJECT LOCATING SYSTEM
Filed May 29, 1961  3 Sheets-Sheet 3
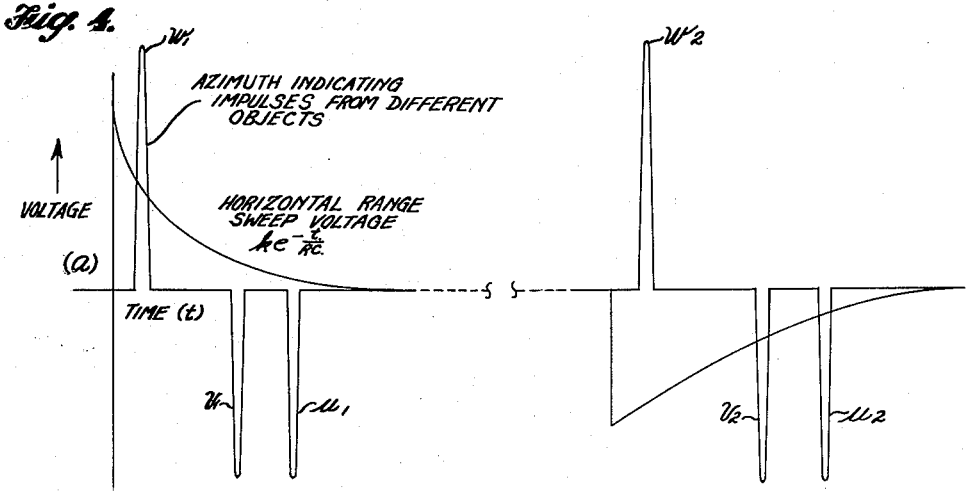
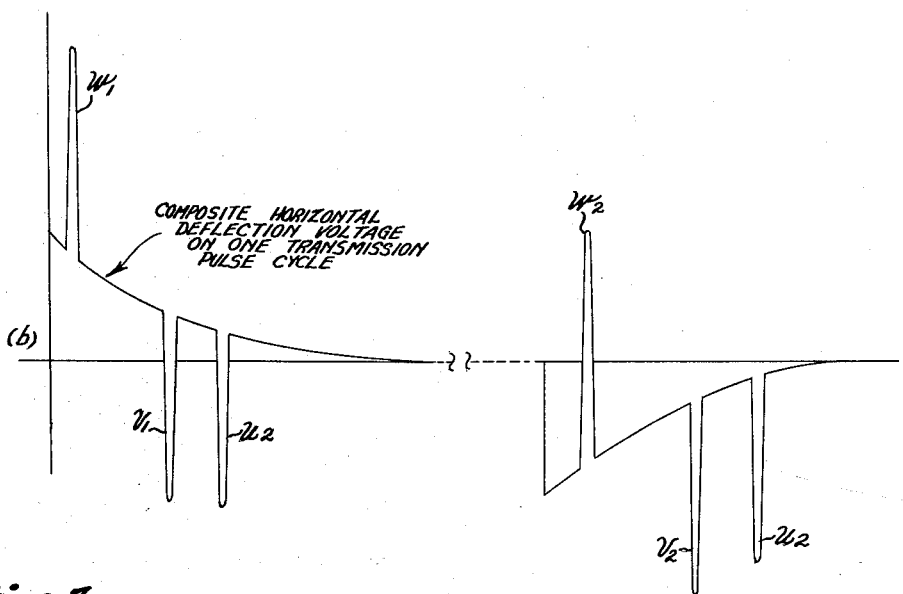
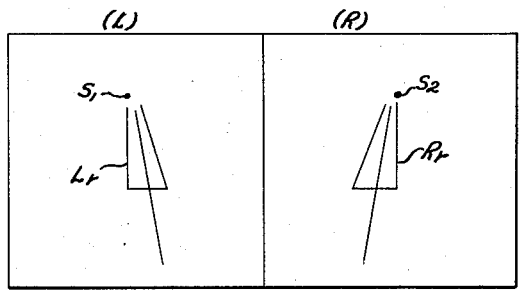
INVENTOR.
FRITZ K. PREIKSCHAT
BY
ATTORNEYS

3,161,875
OBJECT LOCATING SYSTEM
Fritz K. Preikschat, Bellevue, Wash., assignor to Boeing Airplane Company, Seattle, Wash., a corporation of Delaware
Filed May 29, 1961, Ser. No. 125,307
7 Claims. (Cl. 343—7.9)

This invention relates to improvements in search-type pulse-echo propagative wave energy systems for locating objects in space, and more particularly concerns an improved means by which one or more remote objects may be represented positionally on a cathode ray tube screen on a substantially continuous basis. The invention is herein illustratively described by reference to its presently preferred embodiment as applied to radar; however, it will be recognized that certain modifications and changes therein with respect to details may be made without departing from the essential features involved and that the principles of the invention also have application to other kinds of oscillatory wave energy pulse-echo systems.

Conventional radars usually employ a narrow-beam antenna to obtain angular resolution and rely upon periodic mechanical or electrical scanning of the beam throughout a given search region in order to monitor the presence and location of objects in that region. Such systems are relatively complex, large and bulky. Moreover, a rapidly moving object is usually difficult to track and may escape detection altogether because of the comparatively slow scanning movement of the search beam. The time lapse between successive image impressions on the indicator screen, determined by the limited angular scan rate, also tends to create confusion, especially in the case of a plurality of nearby objects which move.

The present invention is directed broadly to overcoming these and similar limitations in search-type systems, especially short-range systems. It is particularly useful for monitoring the relative positions of a plurality of reflecting objects at short range in circumstances wherein the objects are normally or usually distinguishable from each other on the basis of range differences. Accordingly, it will be understood that radars employing this invention are not necessarily intended to supplant or replace long-range pencil-beam search type radars of conventional form, but are primarily intended to supplement the latter or to function independently in various short-range applications. For example, radars incorporating this invention may be used to advantage in anti-collision systems for airplanes, in ground-controlled landing systems, and in aircraft instrument landing systems.

A further object hereof is to provide such a system wherein three-dimensional position indications may be presented stereoscopically in conjunction with three-dimensional graticule markings so as to impart a realistic depth effect to the images which is helpful to a person in analyzing the indications and in responding promptly and reliably thereto.

In accordance with this invention as herein disclosed, rapidly recurrent transmitted energy pulses, usually but not necessarily of microwave frequency, are each directed into the entire space region of interest and the ensuing pulse echoes from all objects within that region are received by an interferometer-type receiving array having a viewing field centered in the search region. Each of the echo pulses is resolved into two cathode ray tube indicator beam deflection impulses, of direct voltage. One is proportional in polarity and magnitude to the associated reflected object's vertical direction angle and the other to its horizontal direction angle relative to the viewing or directional axis of the array. During the height of these paired deflection impulses, respectively associated with each reflecting object, the indicator electron beam is energized or intensified by a third impulse generated by detecting and peaking of the received echo signal, in order to produce a visible spot on the indicator screen. With the inception of each transmitted pulse, a time-base sweep voltage is generated which varies progressively with elapsed time after the instant of transmission, and is applied as an indicator horizontal deflection voltage, upon which the indicator horizontal component directional impulses are superimposed. The composite or resultant voltage controlling actual electron beam deflection horizontally in the cathode ray tube establishes the position of the light spot on the indicator screen caused by instantaneously energizing the electron beam. The polarity of this applied sweep voltage is reversed alternately at a recurrence frequency preferably just above the persistence-of-vision critical frequency of the human eye. As a result, for each reflecting object in the field represented on the indicator screen, and probed by each transmitted impulse from the system, two image spots appear. The two spots representing a single reflecting object are spaced apart horizontally from each other by an amount related to range of the object and define a median point on the screen which is directly related to the relative azimuth and elevation of the object.

An additional feature resides in the provision of separately illuminated range graticules and separately operable viewing shutters respectively associated with the observer's left and right eyes and operated alternately at the sweep voltage polarity-reversing frequency. Thus, during the half-period of each switching cycle when the right hand image spots are formed, the right eye shutter is open and the associated right graticule is illuminated to become visible to that eye, whereas during the remaining half-period when the left hand image spots are formed, the left eye shutter is open and the associated left graticule is illuminated. These graticules may carry range markings which enable the observer to determine range to an object by noting the scale distance between the two image spots for the particular object in relation to the graticule markings. Because of persistence-of-vision, the pairs of image marks are continuously visible for all objects in the field, and because of the synchronous shutter operation and range-diminished spacing between image spots for different objects at various ranges the display has a pseudo-stereoscopic depth effect, which can be enhanced by incorporating on the graticules suitable stereoscopically related markings, such as those representing features of terrain (i.e., a hill, a building, a landing strip runway, or boundaries of a control corridor, etc.), in order to produce a three-dimensional pictorial display.

These and other features, objects and advantages of the invention will become more fully evident from the following description thereof by reference to the accompanying drawings.

FIGURE 4A is a wave diagram showing deflection voltage components influencing cathode ray tube horizontal beam deflection; and FIGURE 4B is a similar wave diagram showing the resultant horizontal deflection voltage.

FIGURE 7 is a diagram illustrating one form which the left and right graticules may take in the case of a ground controlled landing or approach system, for example.

Figure 1:
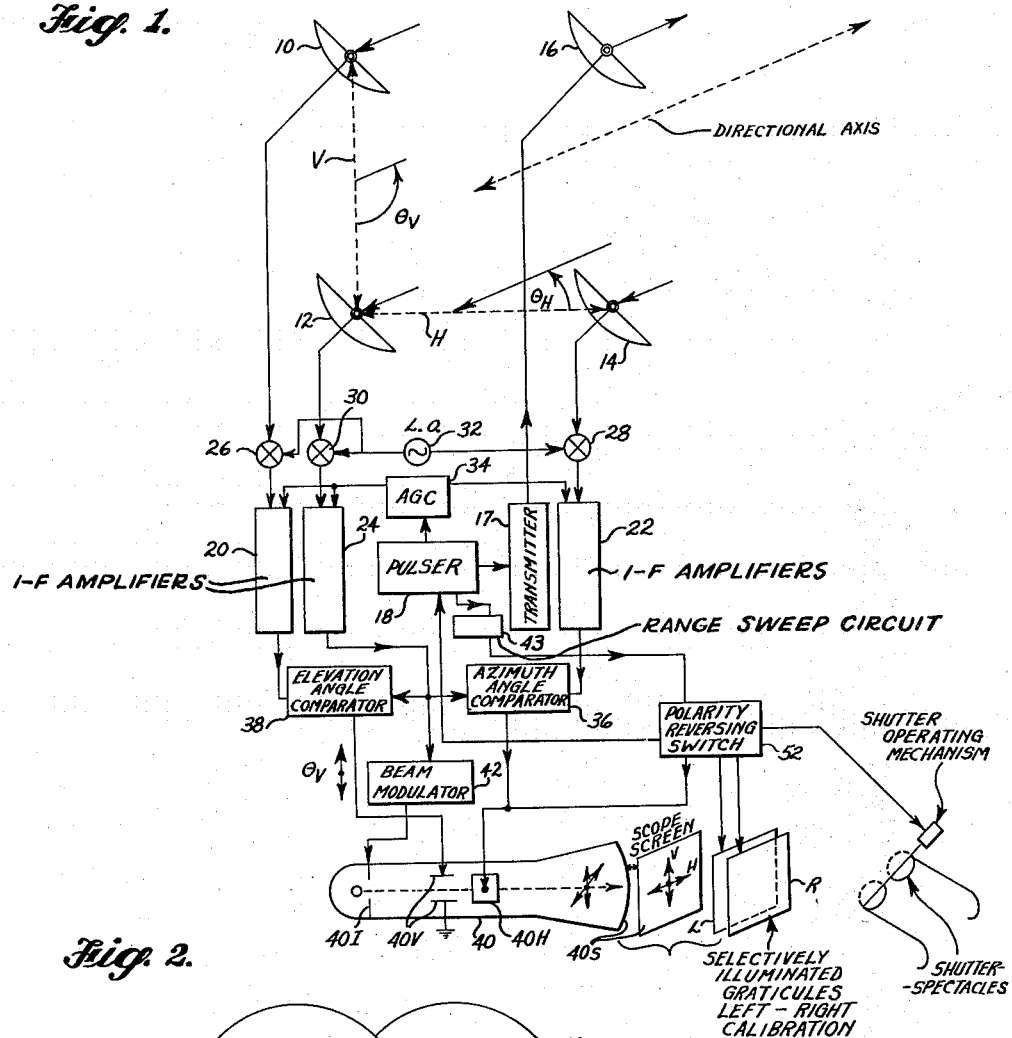
FIGURE 1 is a schematic diagram of a system embodying the invention.
Figure 2:
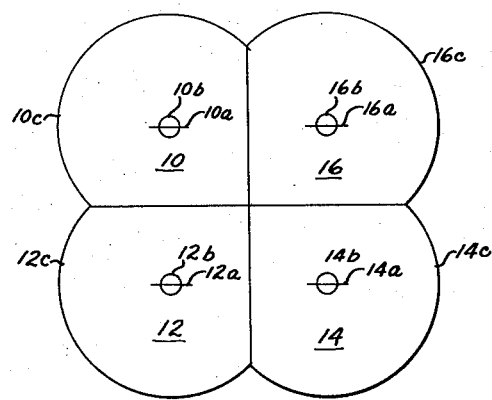
FIGURE 2 illustrates a typical antenna array for use in the system.

Referring to the drawings, three receiving antennas 10, 12 and 14 are cooriented in a composite array with a transmitting antenna 16. As shown these each comprise a dipole radiator *a* and director element *b* cooperating with dish reflector *c* in a conventional manner. The effective focal points of receiving antennas 12 and 14 are spaced apart on a horizontal base line by a predetermined distance H measured in electrical wavelengths so that the electrical phasing of energy reflections received in these two antennas from an object in the search field will bear a predetermined relationship depending on the azimuth incidence angle θH of the reflecting object. Similarly antennas 12 and 10 are spaced apart on a vertical base line by a distance V for a similar reason. Transmitting antenna 16 has no necessary spatial relationship to the receiving antennas but should be located near them as a matter of convenience. Preferably, for reasons of operating efficiency, the transmitting and receiving antennas all have approximately the same directional gain, with a beam width at the half-power points including the desired solid angle representing the desired field of search. No mechanical or electrical scanning of the antennas is necessary to search this field, which is determined in angular volume by the beam width of the antennas and in location by the common direction in which they all point. The beam width may be as small as 10 degrees or even less and as great as 40 degrees or more, all depending on the field-of-view requirements of the system.

Transmitting antenna 16 is intermittently energized by microwave energy pulses of an assigned oscillation frequency, such as in the X-band, and at a desired recurrence rate, such as of the order of 5000 cycles per second, depending on the range. The recurrence rate may usually be made as high as desired since the system, essentially one of large beam width, is primarily a short-range system, yet because every transmitted pulse produces an echo signal from every object in the search field, unlike the case of a scanning type pencil beam search radar, the recurrence rate need not be high in order to "write in" each signal clearly on the indicator. Thus the usual critical problems and comprises with scanning rate, pulse repetition rate, and range of a conventional search type system are not presented with the present system. The pulse length is made as short as necessary to achieve the desired range resolution between objects at different ranges. Transmitter energy is produced by a transmitter 17 operated by a modulator or pulser 18 in a known manner. Pulser 18 is triggered at a desired repetition rate by a suitable timing source which in the example comprises the polarity reversing switch 52 or a portion thereof.

The reflected energy impulses all impinge the three receiving antennas. If a reflecting object is on the directional axis of the array the energy incident on these three antennas is cophased. If it is off the directional axis in azimuth on one side or the other, electrical phasing of the energy received by antenna 12 will lead or lag that of energy received by antenna 14 by a corresponding amount. Likewise if it is off such axis in elevation angle the electrical phasing of the energy received by antenna 12 will lead or lag that of energy received by antenna 10. These phase relationships are preserved in the related intermediate-frequency signals delivered by I-F amplifiers 20, 22 and 24 respectively associated with antennas 10, 12 and 14. Such antenna signals are fed to the respective I-F amplifiers by way of mixers 26, 28 and 30 energized in common by a local oscillator 32. Preferably an automatic cyclic gain control circuit 34 increases the sensitivity of the I-F amplifiers progressively after each transmitted energy pulse in order to maintain approximately equal amplitudes for the I-F output signals independently of range differences. In addition each I-F amplifier (or it may be a separate circuit in the same channel) preferably also has an amplitude limiter (not shown) in its output which normalizes all output signals at the same amplitude. This is done so that the phase resolving operations produce azimuth and elevation indications which are unimpaired by any amplitude differences between received signals, as will more fully appear.

An azimuth phase comparator 36 derives from each I-F oscillation impulse delivered by receivers 22 and 24 a direct voltage impulse which is proportional in magnitude to relative azimuth angle of the reflecting object producing the echo signal impulse and which is related in polarity to the sign of the azimuth angle (viz. to the right or left of the directional axis). Similarly elevation phase comparator 38 derives from each I-F oscillation impulse delivered by receivers 20 and 24 a direct voltage impulse which is proportional in magnitude to relative elevation angle of the reflecting object and which is related in polarity to the sign of the elevation angle (viz. above or below the antenna directional axis). These phase comparators may be of any suitable or known circuit design capable of converting electrical phase differences into direct voltages of related magnitude and polarity. The direct-voltage output pulses from azimuth comparator 36 are applied to the horizontal deflection plates 40H of cathode ray tube 40, whereas those from comparator 38 are applied to the tube's vertical deflection plates 40V.

Figure 6:
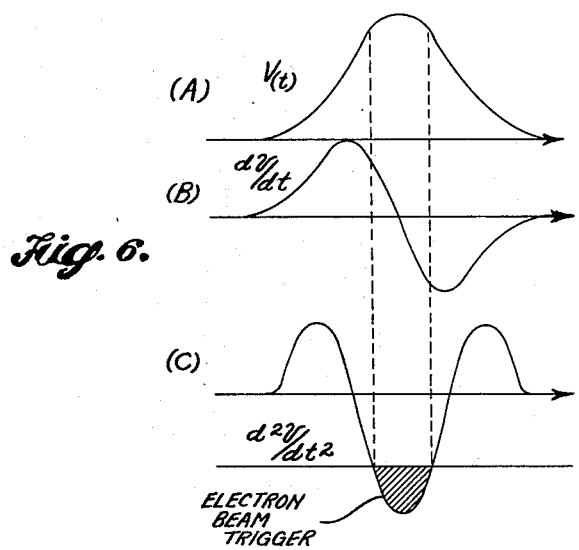
FIGURES 6A, 6B and 6C are wave diagrams illustrating a technique for deriving the cathode ray tube beam modulation impulses.

By suitable bias provisions (not shown) the cathode ray tube's intensity control grid 40I is negatively biased so as to maintain the electron beam intensity level normally just below the level of visibility on the fluorescent indicator screen 40S. The beam is momentarily intensified to produce a visible screen spot by each echo signal received in the system, so that each reflecting object may appear on the screen. This is accomplished by a modulator 42 fed by the output of a receiver, such as 24. As suggested in FIGURE 6, the modulator may operate by detecting the received reflection impulse delivered by I-F amplifier 24, and by then differentiating the detected received impulse $V_t$ (FIGURE 6A), to produce the transient $$\frac{dV_t}{dt}$$

shown in FIGURE 6B. This in turn is shortened by being differentiated to produce the sharpened impulse group shown in FIGURE 6C, $$\frac{d^2V_t}{dt^2}$$

The sharp intermediate impulse of this group is then detected or its peak (as represented by the shaded area) is inverted by the beam modulator and used to intensify the indicator beam at the height of the received signal. Since the resultant beam modulation impulse turns on the electron beam only for a brief instant while the azimuth and elevation deflection voltages are at their full values on the cathode ray deflection plates, the object or target image spots occurring on the screen are sharply and accurately defined for positional indication purposes.

Figure 3:
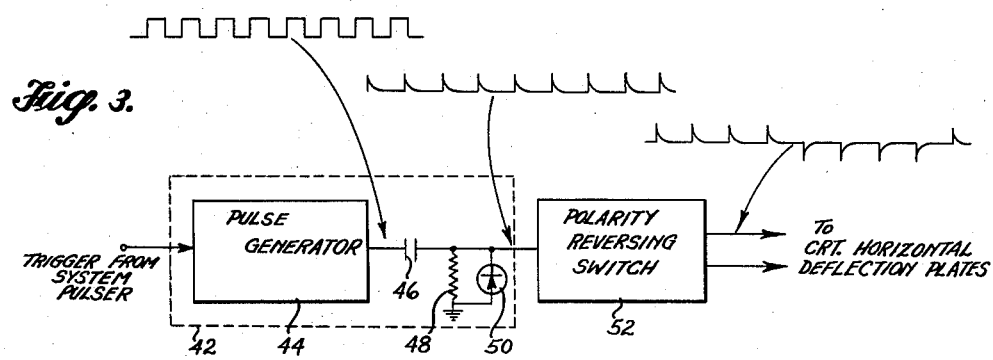
FIGURE 3 is a schematic diagram showing apparatus for generating the horizontal range sweep voltages.
Figure 5:
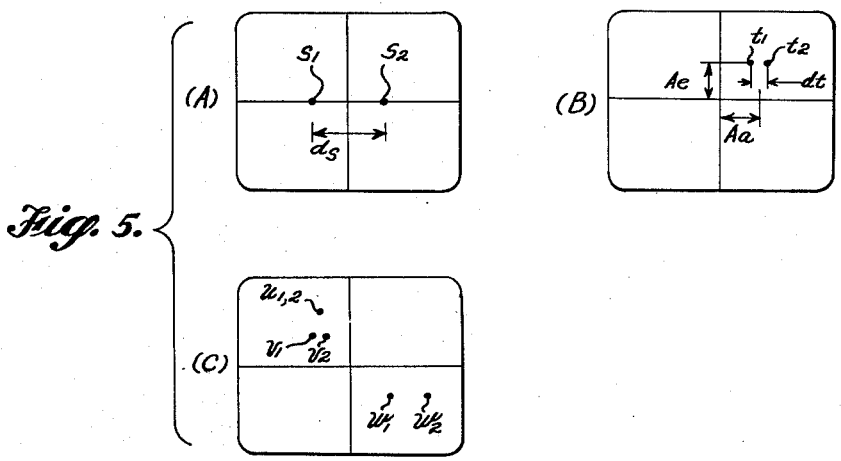
FIGURES 5A, 5B and 5C illustrate the appearance of typical object images at different ranges and location angles on the indicator screen without the graticules imposed thereon.

It will be noted that the detailed description of the system as thus far developed includes no reference to indicating range of reflecting objects producing the indicator-operating signals, but refers only to azimuth and elevation indications. In accordance with important features of this invention range information is also imparted to the indications and in a manner lending a stereoscopic depth effect thereto. Instead of permitting each object image to appear on the screen as a single light spot, it is caused to appear as a straight line defined and terminated by two separate light spots separated horizontally by a distance related, preferably inversely, to range, and located on the screen so that the median point between them represents the object's azimuth position whereas the horizontal line passing through the two light spots represents its elevation position. To this end a range sweep circuit 43 pulsed by the transmitter pulser 18 generates a recurring range sweep voltage wave initiated cyclically with the inception of each transmitted pulse. This range sweep wave may assume a linear time functional form, an approximation thereto as in the illustrated case wherein it is exponential, or it may have some other shape as a function of time, hence of range. In FIGURE 3 the pulse generator 44 is triggered by the system pulses and applies a square wave of predetermined amplitude to one side of an R-C exponential wave generator comprising condenser 46 and resistor 48. The time-constant of this R-C circuit determines the initial slope of the resultant exponential function thus generated. Thus, the resistance and capacitance values are chosen to extend the substantially linear initial portion of the exponential function for the principal portion of the range interval (i.e., pulse to pulse period), so that echoes from objects within the range of interest of the system will be received during said portion. Negative excursion waves which would otherwise also be developed by this R-C circuit are avoided by connecting a clamp diode 50 across resistor 48. The resultant wave form is applied to a cyclically operated polarity reversing switch device 52 which reverses the polarity of the exponential sweep waves at a frequency just above (it could be well above) the minimum necessary to achieve a steady image effect with reliance upon persistence of vision of the human eye. The sweep wave groups of alternately opposite polarity are then applied to the horizontal deflection plates of the cathode ray tube additively with the direct voltage impulses signifying azimuth deflection, as depicted in FIGURE 4. The result is as depicted in FIGURE 5. In FIGURE 5A the range-spaced light spots $S_1$ and $S_2$ represent a nearby object located on the directional axis of the antenna at a range approximately proportional to the inverse of the distance $d_s$ separating the spots. In FIGURE 5B an object is represented by spots $t_1$ and $t_2$ spaced apart by a distance $d_t$, which object is at greater range (i.e., proportioned to $1/d_t$) and has an elevation angle $A_e$ and an azimuth $A_a$. In FIGURE 5C the images of three distinct objects appear, one at such a great range that its image spots are merged into one ($U_{1,2}$) in the upper left quadrant, another at an intermediate range and in the upper left quadrant of the field of view ($v_1v_2$) and the third at close range in the lower right quadrant ($w_1w_2$).

In order to be separately distinguishable and identifiable it is of course necessary that the reflecting objects be at different ranges so that their reflected energy pulses do not coincide in point of time. For most applications for which the invention is intended this condition is practically certain to be met at all times, or sufficiently so that no problem of loss of resolution is likely to arise.

It will, of course, be evident that a cathode ray tube display of this type may be presented which can be viewed and interpreted directly without additional refinements or viewing aids. However, as previously suggested herein, certain important advantages are realizable in accordance with this invention when the illustrated stereoscopic viewing arrangements are employed. These preferably include two separate graticule screens L and R mutually superimposed on the cathode ray tube screen and one (L) carrying range index markings and any other desired indicia such as terrain features as they would be seen three-dimensionally through the left eye, and the other (R) carrying stereoscopically related markings and indicia seen by the right eye. These are illuminated alternately by the range sweep polarity reversing switch device, or synchronously with the latter's operation. The viewer wears or peers through a shutter mechanism such as the motor or solenoid actuated shutter spectacles, also controlled by the switch device 52, with such phasing in the alternate operation of the left and right eye shutters that the left eye sees only the left graticule and left-hand image spots of the different target images, while the right eye sees only the right graticule and right-hand image spots. The human optical system, including its image coordination effect and persistence of vision combine the flickering indication components into a composite three-dimensional indication wherein the objects appear in depth and their respective ranges may be read off if the graticules are numerically referenced, or merely sensed in terms of relationship to predetermined reference points, such as terrain features, if numerical evaluations are unnecessary. For example, in FIGURE 7, the indicia markings on the L and R graticules represent a runway outline $L_r$ and $R_r$. Viewed stereoptically these graticule runway images combine into a single image with a depth aspect. The target image spots $S_1$ and $S_2$ viewed by the left and right eyes, respectively, as by a ground station observer studying the landing approach of an airplane to the runway initially appear over the far end of the runway at close spacing to each other, as would appear the wing tip location lights of the airplane seen directly with the eyes. If desired, the observer may then gauge the airplane's position and range by reference to the graticule picture and direct its flight to a landing through usual GCA type radio communication methods. Other or supplemental graticule markings may be added if desired, so as to associate instantaneous and changing range of the airplane with acceptable elevation and azimuth limits and permit warnings of danger conditions such as approaching physical obstructions or an unsafe approach pattern.

It will also be evident that the radar system may be used as an airplane landing aid on a field having its runway marked with corner reflectors.

These and other aspects of the invention will be recognized from the foregoing description of the preferred embodiment.

I claim as my invention:

1. An object locating system comprising in combination with means to transmit recurrent propagative wave energy impulses of predetermined wave frequency into a selected space region and receiver means to receive the reflection impulses from objects within said region, said receiver means including directionally selective antenna elements in an array having a directional axis and with elements therein spaced apart in said array transversely to said axis, phase comparator circuit means energized thereby to produce from each received reflection impulse impinging the respective antenna elements a direct voltage impulse related in magnitude and polarity to the angle and sense of deviation from said axis of the reflecting object producing such received reflection impulse, a cathode ray tube indicator having beam deflection means responsively connected to said phase comparator circuit means and further having beam intensity control means normally biased against image production on the screen of said indicator, modulator means responsively connected to said receiver means and operatively connected to said intensity control means for applying a beam intensifying impulse to the latter substantially at the height of said direct voltage impulse in response to each received reflection impulse to produce from each of the latter a visible angular position object spot image on said screen, a range sweep waveform generator operatively connected to said beam deflection means to be triggered cyclically with the propagative wave energy impulses, said generator applying to said deflection means a progressively changing time-base cathode ray tube beam deflection signal of selected polarity superimposed on the direct voltage impulses to deflect the spot images in accordance with range to the associated reflecting objects, and switching means operable to reverse the polarity of said range sweep signals at a reversal frequency above the critical persistence-of-vision frequency to produce spot images on the screen separated by a distance on the screen inversely proportional to the range of the associated reflecting objects.

2. The object locating system defined in claim 1, wherein the antenna elements are spaced horizontally and the resultant two image spots appearing for each object are spaced apart horizontally, and calibrated stereoscopic viewing means for the indicator comprising left and right graticules mutually superimposed optically on the indicator screen, and means operated synchronously with said switching means to render the left graticule visible selectively to the observer's left eye during appearance of the left image spot, and the right graticule visible selectively to the observer's right eye during appearance of the right image spot.

3. The object locating system defined in claim 2, wherein the respective graticules have stereoscopically related pictorial markings thereon to which the object spot images may be related for positional association of the latter with stereoscopic depth effect presented to the observer.

4. An object locating system comprising in combination with means to transmit recurrent propagative wave energy impulses of predetermined wave frequency into a selected space region and receiver means to receive the reflection impulses from objects within said region, said receiver means including more than two directionally selective antenna elements in an array having a directional axis and with elements therein spaced apart in said array transversely to said axis in each of two mutually perpendicular planes, separate phase comparator circuit means energized respectively by the elements in the two planes to produce from each received reflection impulse impinging the respective antenna elements two direct voltage impulses related in magnitude and polarity to the angle and sense of deviation from said axis in each of said planes of the reflecting object producing such received reflection impulse, a cathode ray tube indicator having orthogonally related horizontal and vertical beam deflection means responsively connected to the respective phase comparator circuit means and further having beam intensity control means normally biased against image production on the screen of said indicator, modulator means responsively connected to said receiver means and operatively connected to said intensity control means for applying a beam intensifying impulse to the latter substantially at the height of said direct voltage impulses in response to each received reflection impulse to produce from each of the latter a visible angular position object spot image on said screen, a range sweep wave form generator operatively connected to said horizontal beam deflection means to be triggered cyclically with the propagative wave energy impulses, said generator applying to said horizontal deflection means a progressively changing time-base cathode ray tube beam deflection signal of selected polarity superimposed on the direct voltage impulses to deflect the spot images horizontally in accordance with range to the associated reflecting objects, and switching means operable to reverse the polarity of said range sweep signals at a reversal frequency above the critical persistence-of-vision frequency to produce spot images on the screen separated by a distance on the screen inversely proportional to the range of the associated reflecting objects.

5. The object location system defined in claim 4, and calibrated stereoscopic viewing means for the indicator comprising left and right graticules mutually superimposed optically on the indicator screen, and means operated synchronously with said switching means to render the left graticule visible selectively to the observer's left eye during appearance of the left image spot, and the right graticule visible selectively to the observer's right eye during appearance of the right image spot.

6. The object locating system defined in claim 5, wherein the respective graticules have stereoscopically related pictorial markings thereon to which the object spot images may be related for positional association of the latter with stereoscopic depth effect presented to the observer.

7. In an object locating system having means to produce on a cathode ray tube indicator screen two image spots spaced apart horizontally approximately inversely in proportion to range for each object located by the system, the median of said spots being located on the screen in accordance with the azimuth and elevation angles of the associated objects, and calibrated stereoscopic viewing means for the indicator comprising left and right stereoscopically related graticules mutually superimposed optically on the indicator screen, each of said graticules being associated with one of said image spots, and means operable to render the left and right graticules and their associated image spots visible alternately and selectively to the observer's left and right eyes at a frequency above the persistence-of-vision frequency to the human eye.

References Cited in the file of this patent
UNITED STATES PATENTS

| 2,408,050 | De Rosa | Sept. 24, 1946 |
| 2,578,970 | Gannaway | Dec. 18, 1951 |
| 2,824,302 | Poor | Feb. 18, 1958 |
| 2,929,056 | Page | Mar. 15, 1960 |